(12) United States Patent
Peregrina Loera et al.

(10) Patent No.: US 10,093,209 B2
(45) Date of Patent: Oct. 9, 2018

(54) SEAT FRAME SIDE SHIELD WITH INTEGRAL MOUNTING BRIDGE

(71) Applicant: FORD GLOBAL TECHNOLOGIES, LLC, Dearborn, MI (US)

(72) Inventors: Jose Alfredo Peregrina Loera, Mexico City (MX); Francisco Javier Ferreira Yanez, Atizapan de Zaragoza (MX); Edgardo Fabricio Ortiz Hernandez, Toluca (MX); Carlos Alberto Caballero De Ita, Benito Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/146,469

(22) Filed: May 4, 2016

(65) Prior Publication Data
US 2017/0320414 A1    Nov. 9, 2017

(51) Int. Cl.
*B60N 2/60* (2006.01)
*B60N 2/90* (2018.01)
*B60N 2/02* (2006.01)
*B60N 2/58* (2006.01)

(52) U.S. Cl.
CPC ......... *B60N 2/6027* (2013.01); *B60N 2/0228* (2013.01); *B60N 2/0244* (2013.01); *B60N 2/5816* (2013.01); *B60N 2/5825* (2013.01); *B60N 2/60* (2013.01); *B60N 2/6009* (2013.01); *B60N 2/90* (2018.02); *B60N 2/919* (2018.02)

(58) Field of Classification Search
CPC ........ B60N 2/0228; B60N 2/44; B60N 2/442; B60N 2/0244; B60N 2/60; B60N 2/6027; B60N 2/5816; B60N 2/5825

USPC .................. 297/217.3, 452.38, 463.1, 463.2; 296/65.01, 67

See application file for complete search history.

(56) References Cited

U.S. PATENT DOCUMENTS

| | | | |
|---|---|---|---|
| 5,007,682 A * | 4/1991 | Kuwabara | B60N 2/00 297/452.38 |
| 7,237,846 B1 | 7/2007 | Arima | |
| 7,997,656 B2 | 8/2011 | Inagaki et al. | |
| 8,757,702 B2 * | 6/2014 | Biebel | B60N 2/6009 296/187.05 |
| 2007/0273195 A1 | 11/2007 | Adragna et al. | |
| 2009/0146485 A1 * | 6/2009 | Inagaki | B60N 2/0224 297/463.1 |
| 2017/0028942 A1 * | 2/2017 | Nakagawa | B60N 2/44 |
| 2017/0028943 A1 * | 2/2017 | Nakagawa | B60N 2/6009 |
| 2017/0036577 A1 * | 2/2017 | Line | B60N 2/68 |

(Continued)

FOREIGN PATENT DOCUMENTS

CN    203645931 U    6/2014

OTHER PUBLICATIONS

English Machine Translation of CN203645931U.

*Primary Examiner* — Robert Canfield
(74) *Attorney, Agent, or Firm* — Vichit Chea; King & Schickli, PLLC

(57) ABSTRACT

A side shield is provided for a seat frame. That side shield includes a body having a housing and an integral mounting bridge as well as a seat control switch assembly. The seat control switch assembly is held in an opening defined between the housing and the integral mounting bridge. In addition, a locator feature is carried on the integral mounting bridge. That locator feature receives a locator lug carried on the seat frame. A seat assembly is also provided.

15 Claims, 9 Drawing Sheets

(56) References Cited

U.S. PATENT DOCUMENTS

2017/0129374 A1\* 5/2017 Ortiz Hernandez ..... B60N 2/06
2017/0291512 A1\* 10/2017 Peregrina Loera ...... B60N 2/44

\* cited by examiner

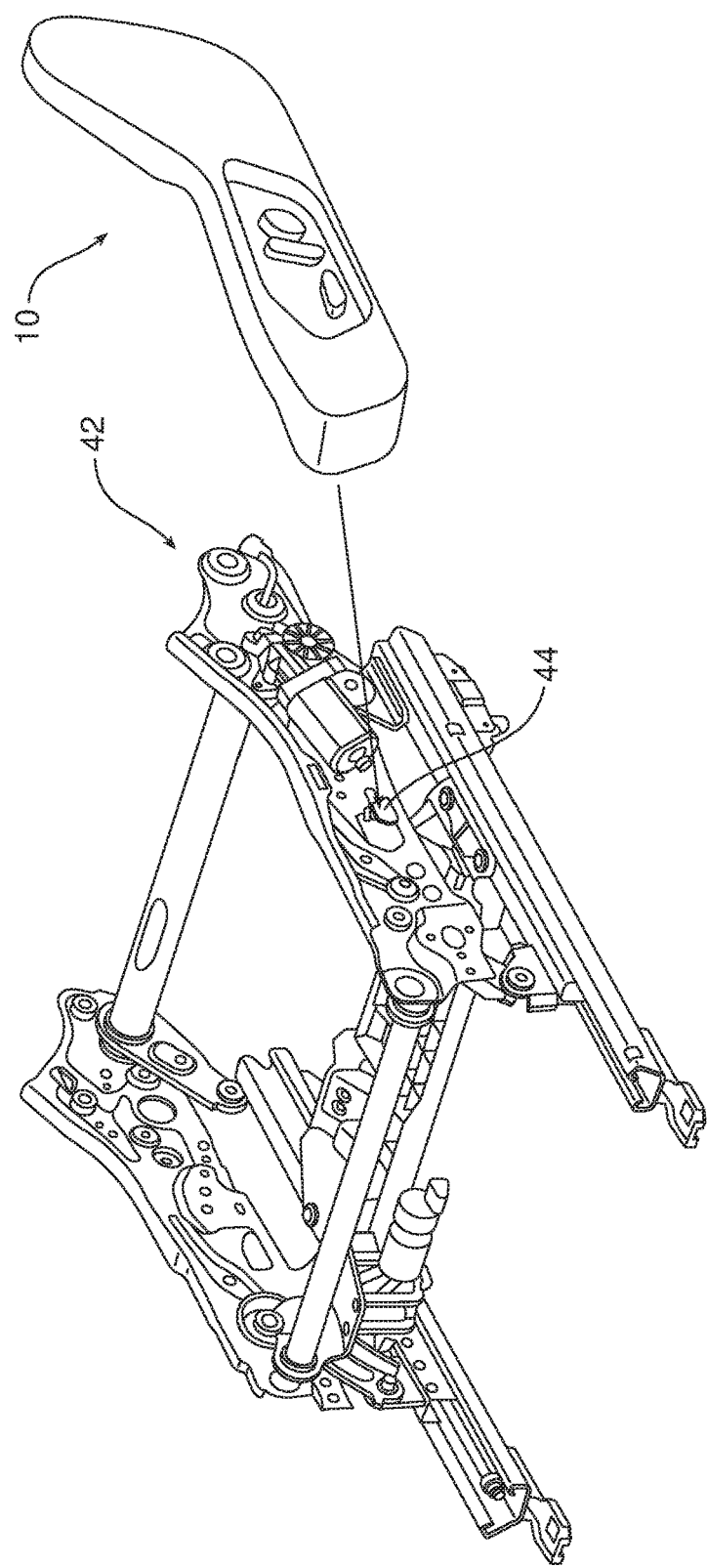

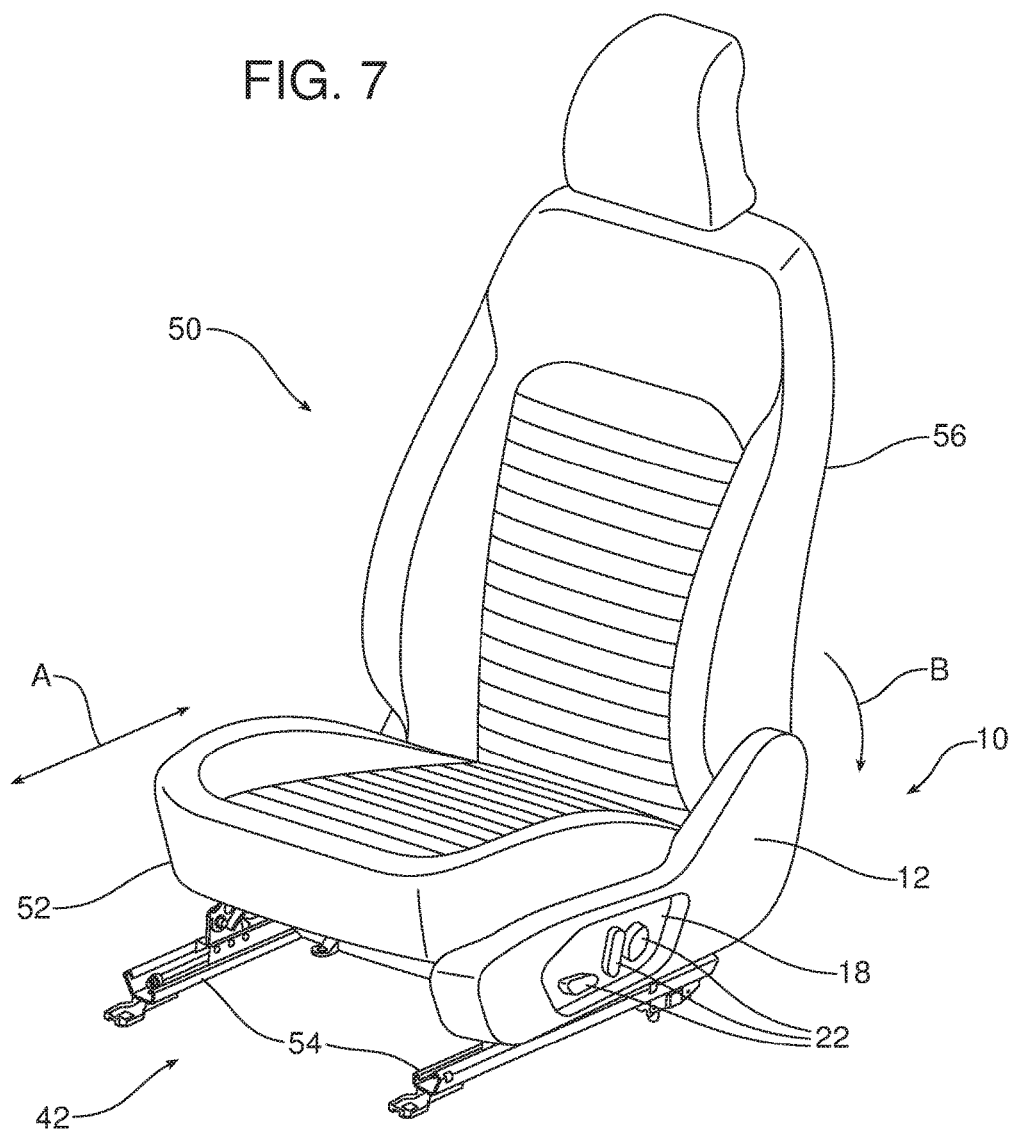

US 10,093,209 B2

SEAT FRAME SIDE SHIELD WITH INTEGRAL MOUNTING BRIDGE

TECHNICAL FIELD

This document relates generally to the motor vehicle equipment field and, more particularly, to a seat frame side shield incorporating an integral mounting bridge for easier location and attachment to a seat frame.

BACKGROUND

This document relates to a new and improved side shield for a seat frame as well as to a new and improved seat assembly incorporating that side shield. Advantageously, the side shield includes an integral mounting bridge in the form of a tapered receiver which extends around the seat control switch assembly to engage and hold a locator lug on the seat frame. The locator feature simplifies the location and attachment of the side shield to the seat frame while also providing a tight fit between parts for a more aesthetically pleasing appearance. Advantageously, the integral mounting bridge with the locator feature eliminates the need for extra parts and fasteners thereby reducing production costs and shortening assembly times while also advantageously providing for a stable and rock-free connection as well as a stronger structure.

SUMMARY

In accordance with the purposes and benefits described herein, a side shield is provided for a seat frame. That side shield comprises a body, including (a) a housing and an integral mounting bridge, and (b) a seat control switch assembly held in an opening defined between the housing and the integral mounting bridge. A locator feature is carried on the integral mounting bridge. That locator feature may take the form of a tapered receiver.

That tapered receiver may have a first open end and a second open end wherein the first open end has a greater cross-sectional area than the second open end. The side shield may also include a plurality of mounting bosses on the housing that receive and hold a plurality of fasteners which secure the seat control switch assembly to the body.

The housing may also include a recessed portion and a plurality of apertures in the recessed portion that receive switch controls of the seat control switch assembly. In such an embodiment, the integral mounting bridge may have a first end that engages the housing on a first side of the recessed portion and a second end that engages the housing on a second side of the recessed portion.

In accordance with an additional aspect, a seat assembly is provided for a motor vehicle. That seat assembly includes a side shield, having a body which includes (a) a housing and (b) an integral mounting bridge with a locator feature. Further, the seat assembly may include a seat frame including a locator lug received in the locator feature. In addition, a seat control switch assembly may be held in an opening defined between the housing and the integral mounting bridge.

The seat assembly may also include a seat bottom and a seat back carried on the seat frame. Further, the locator feature may be a tapered receiver. Such a tapered receiver may have a first open end and a second open end. The first open end may have a greater cross-sectional area than the second open end.

In addition, a plurality of mounting bosses may be provided on the housing. Those mounting bosses receive and hold a plurality of fasteners securing the seat control switch assembly to the body underneath the integral mounting bridge.

The housing may further include a recessed portion and a plurality of apertures in the recessed portion to receive switch controls of the seat control switch assembly. Further, the integral mounting bridge may have a first end that engages the housing on a first side of the recessed portion and a second end that engages the housing on a second side of the recessed portion.

In the following description, there are shown and described several preferred embodiments of the side shield and the seat assembly. As it should be realized, the side shield and the seat assembly are capable of other, different embodiments and their several details are capable of modification in various, obvious aspects all without departing from the side shield and the seat assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the side shield and the seat assembly and together with the description serve to explain certain principles thereof. In the drawing figures:

FIG. 5 is a partially exploded view illustrating the mounting of the side shield to the seat frame.

FIG. 7 is a perspective view of the assembled seat assembly.

Figure 1:
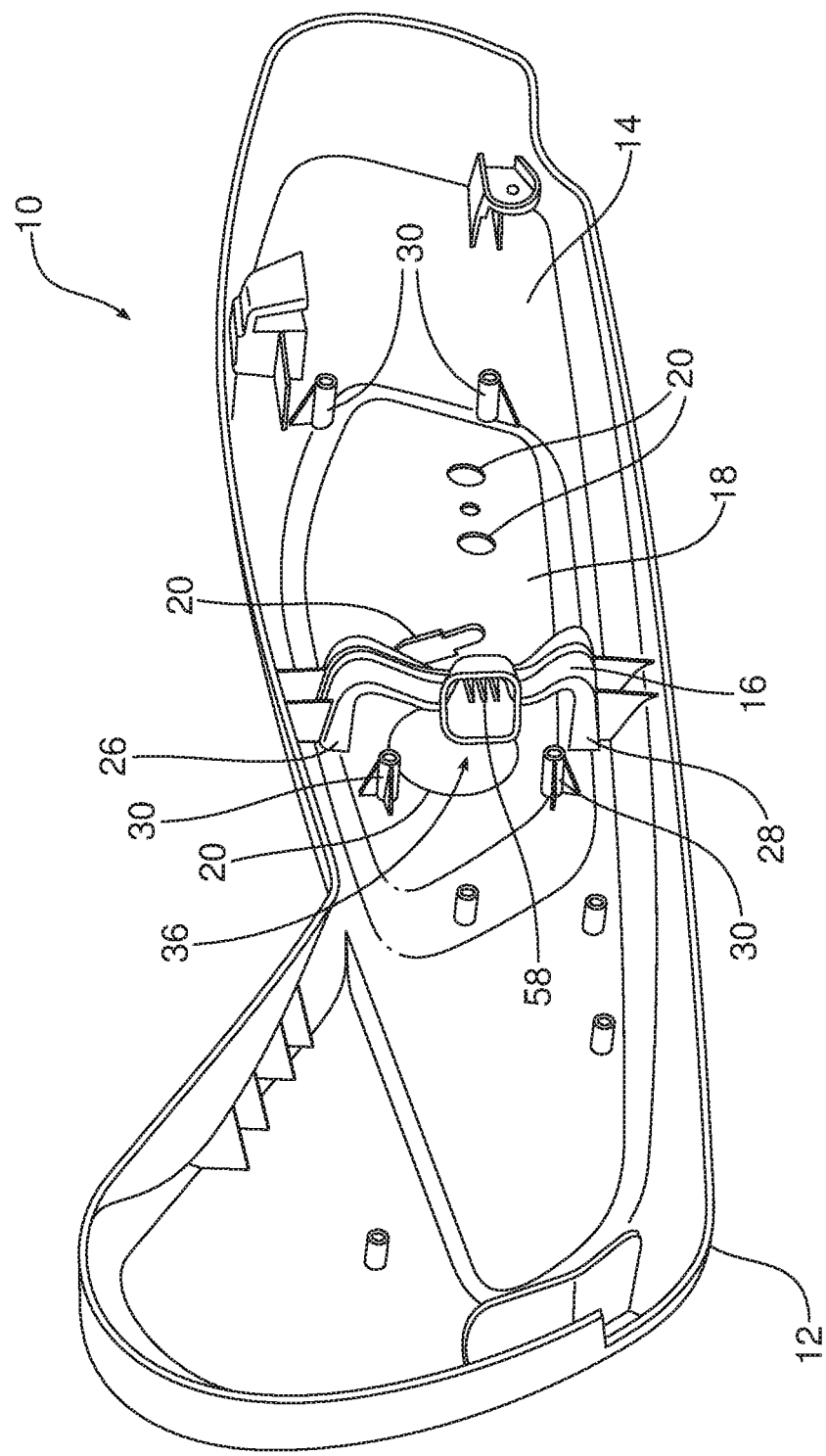
FIG. 1 is a perspective view of the inner surface of the side shield illustrating the body thereof including the housing and the integral mounting bridge.

Reference will now be made in detail to the present preferred embodiments of the side shield and seat assembly, examples of which are illustrated in the accompanying drawing figures.

DETAILED DESCRIPTION

Reference is now made to FIGS. 1-4 illustrating the side shield 10. As illustrated, the side shield 10 includes a body 12 including a housing 14 and an integral mounting bridge 16. More specifically, the housing 14 includes a recessed portion 18 and a plurality of apertures 20 in the recessed portion that receive switch controls 22 of the seat control switch assembly 24 (see also FIG. 7 illustrating the assembled seat assembly 50).

Figure 2:
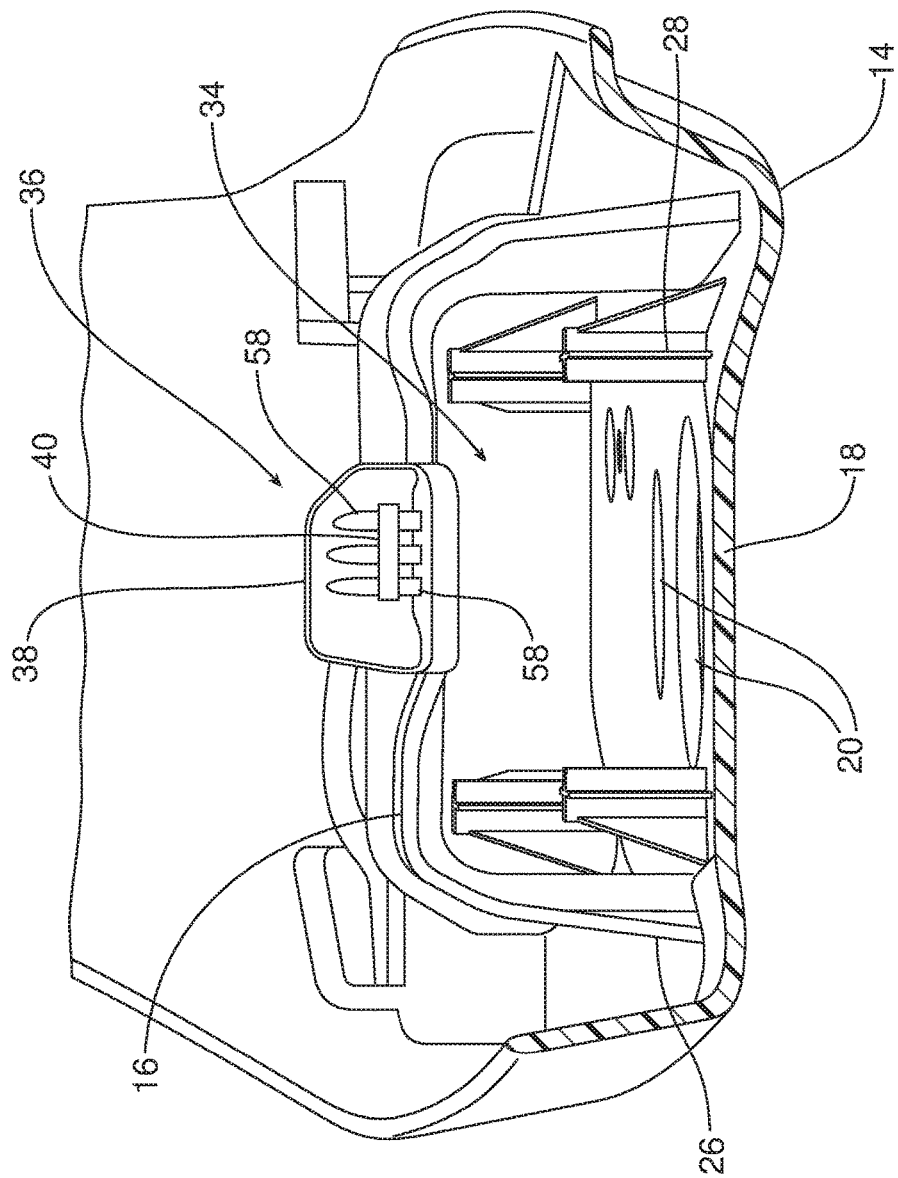
FIG. 2 is a cross-sectional view of the side shield illustrated in FIG. 1 showing the recess in the body and how the two ends of the mounting bridge are molded integrally with the housing of the body.

As best illustrated in FIG. 2, the integral mounting bridge 16 includes a first end 26 integrally connected to the housing 14 on a first side of the recessed portion 18 and a second end 28 that is integrally joined with the housing on a second side of the recessed portion.

Figure 4:
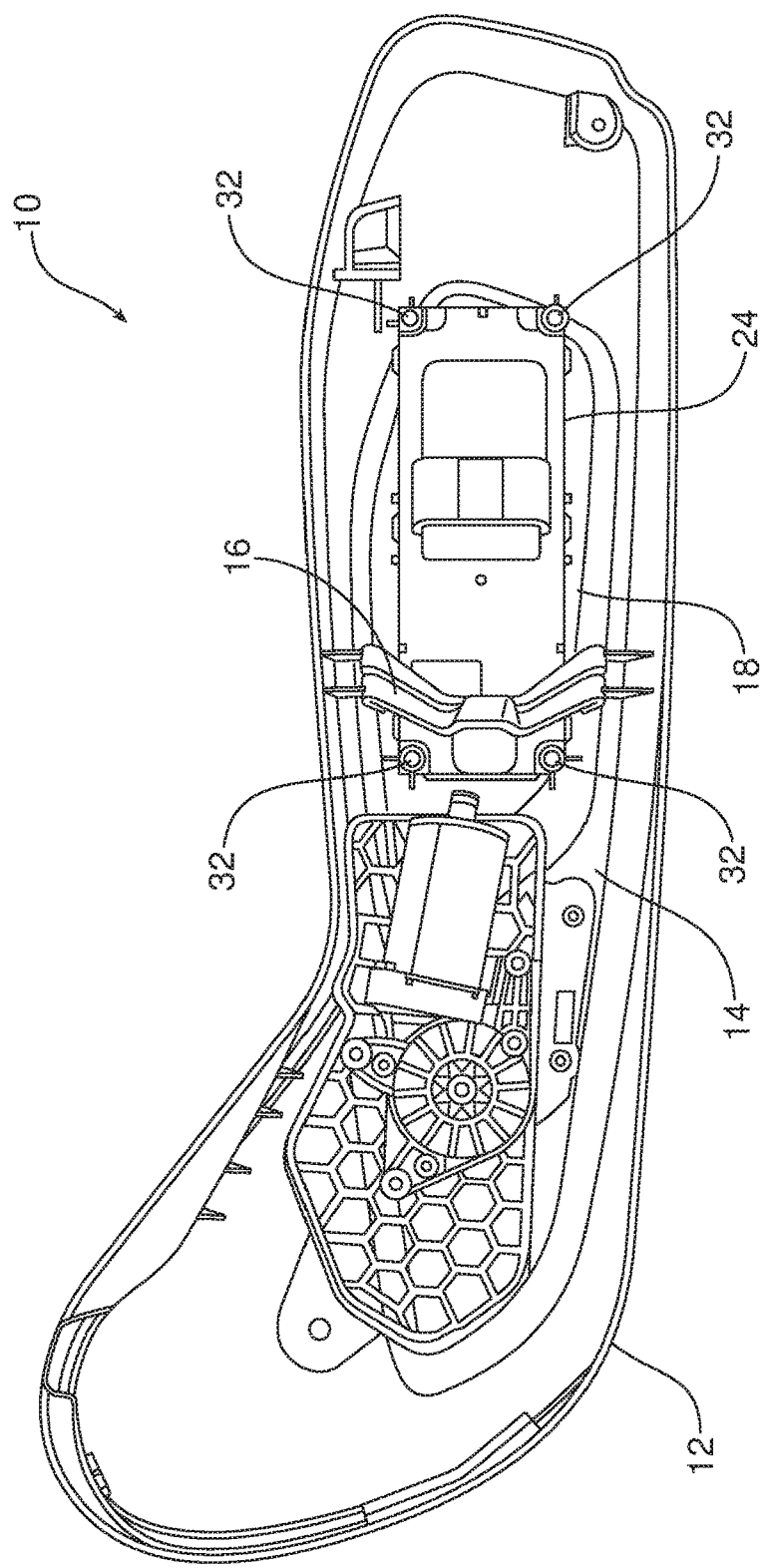
FIG. 4 is a side elevational view of the side shield illustrating how the seat control switch assembly is held in an opening defined between the housing and the integral mounting bridge of the body.

As best illustrated in FIGS. 1, 2 and 4, a plurality of mounting bosses 30 are carried on the inner face of the housing 14. These mounting bosses 30 receive a plurality of fasteners 32 that secure the seat control switch assembly 24 to the housing 14 in the opening 34 defined between the housing and the integral mounting bridge 16.

As further illustrated in FIGS. 1-4, a locator feature, generally designated by reference numeral 36 is carried on the integral mounting bridge 16. In the illustrated embodiment, that locator feature 36 comprises a tapered receiver having a first open end 38 and a second open end 40. As should be appreciated, the first open end 38 has a greater cross-sectional area than the second open end 40.

Figure 5A:
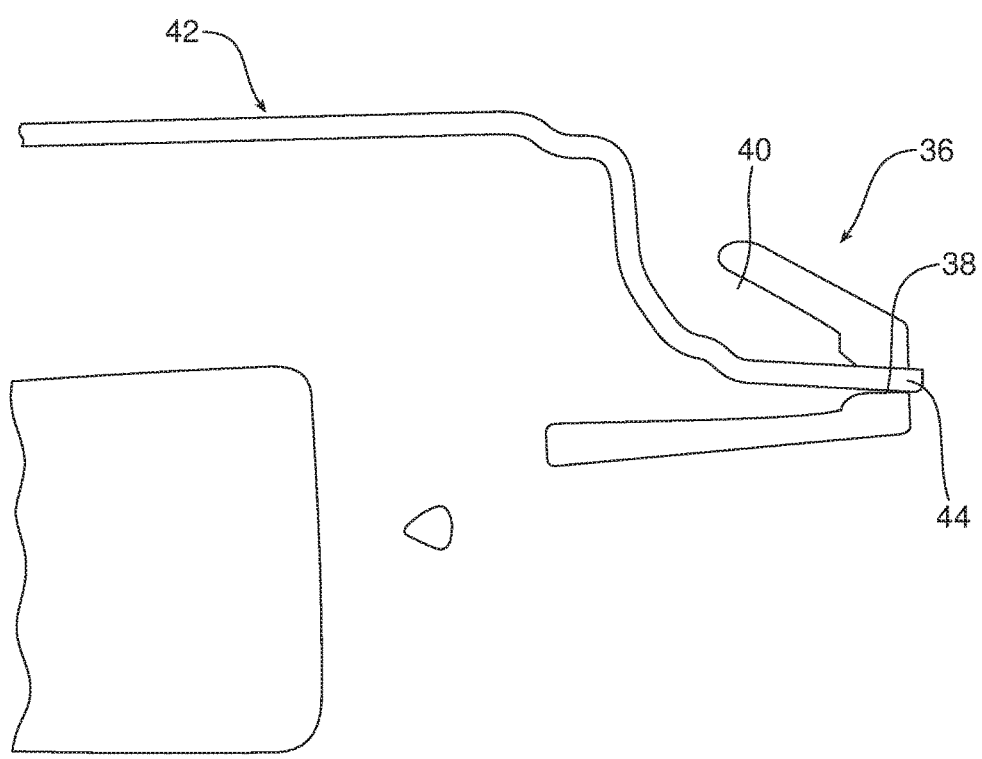
FIG. 5a is a schematic cross-sectional view illustrating how the locator lug on the seat frame is received and held in the locator feature/tapered receiver carried on the integral mounting bridge of the side shield body.
Figure 5B:
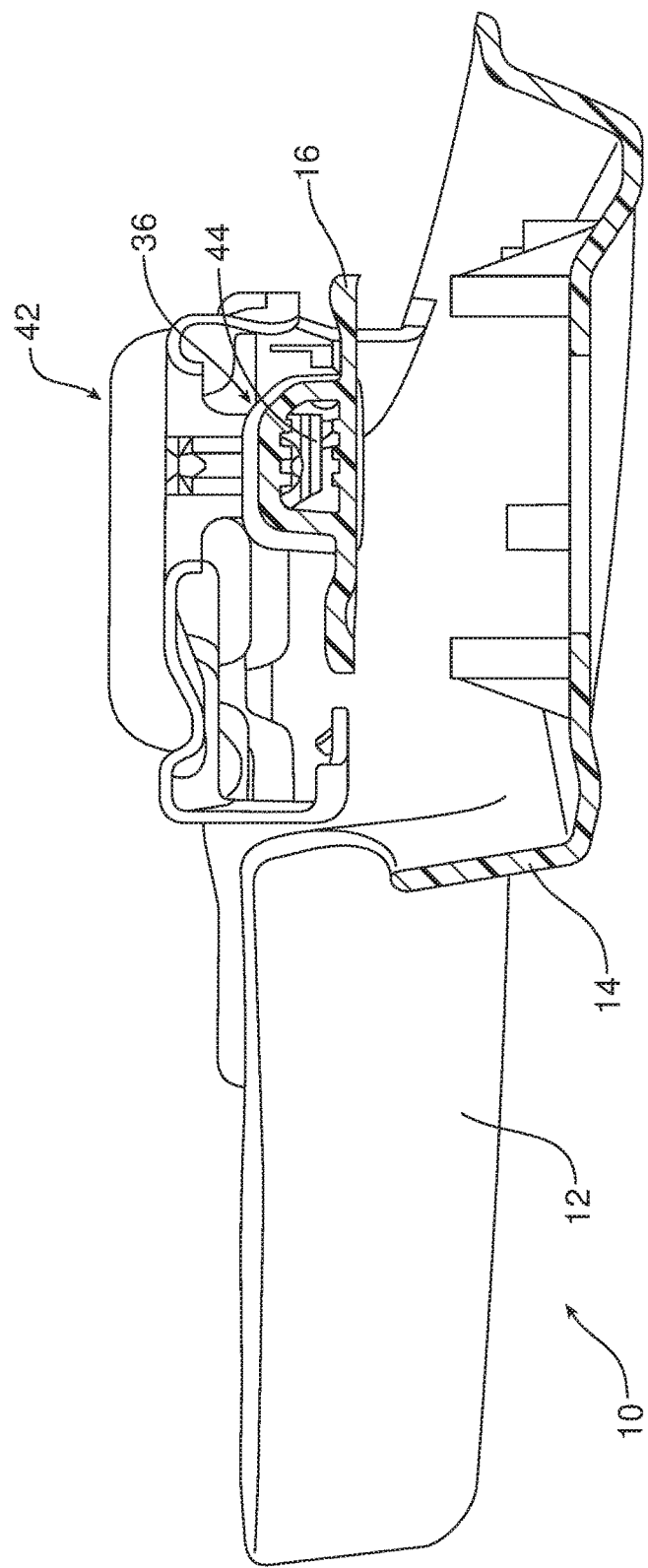
FIG. 5b is a cross-sectional view through the side shield and seat frame at the locator feature, showing the components in the assembled condition.
Figure 6:
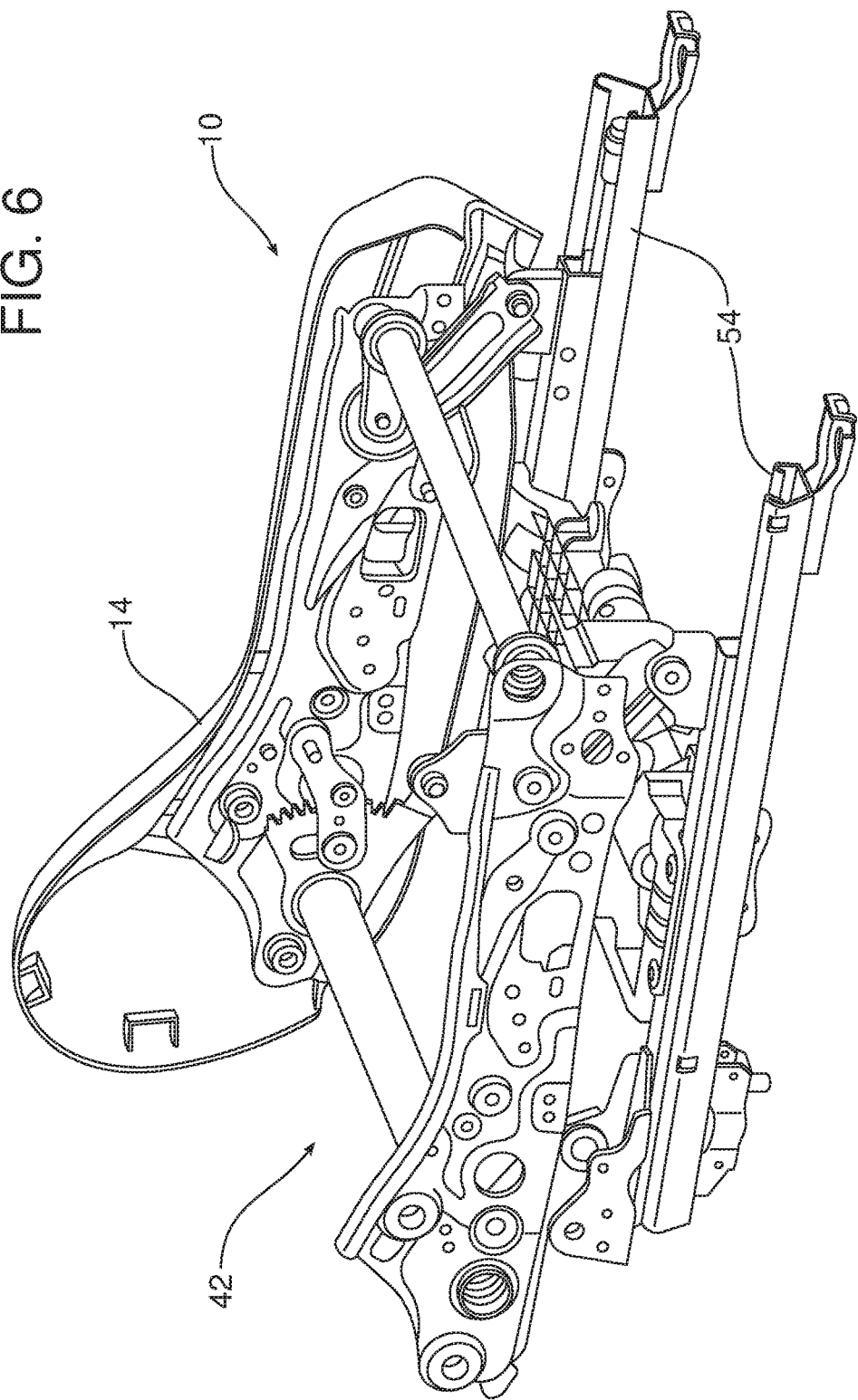
FIG. 6 is a perspective view illustrating the side shield assembled to the seat frame.

Reference is now made to FIGS. 5-5b, which illustrate how the side shield 10 is secured to the seat frame 42. As illustrated in FIG. 5a, the seat frame 42 includes a locator tab or lug 44. During assembly, the side shield 10 is manipulated with respect to the seat frame 42 until the locator lug 44 is engaged with the first, larger open end 38 of the locator feature 36 carried on the integral mounting bridge 16. The side shield 10 is then manipulated with respect to the seat frame 42 so that the locator lug 44 is fully received down through the locator feature 36 so that the lug extends through and engages the second, smaller opened end 40 of the locator feature 36. This sliding engagement between the locator lug 44 and the locator feature 36 ensures that the side shield 10 is properly oriented with respect to the seat frame 42 before being fastened in position by means of fasteners not shown. See also FIG. 5b. FIG. 6 is a perspective view illustrating the side shield 10 properly seated and assembled with the seat frame 42.

Reference is now made to FIG. 7 illustrating a fully assembled seat assembly 50 comprising the side shield 10 illustrated in FIGS. 1-4 connected to the seat frame 42 illustrated in FIGS. 5 and 6 by means of the engagement of the locator lug 44 on the seat frame 42 with the locator feature 36 carried on the integral mounting bridge 16 of the side shield. As best illustrated in FIGS. 4 and 7, the seat control switch assembly 24 is easily located and secured in the opening 34 between the housing 14 and the integral mounting bridge 16 with the switch controls 22 extending through the apertures 20 in the recessed portion 18 of the body 12 where they may be easily accessed by the vehicle operator to move the seat into any desired position. This includes moving the position of the seat bottom 52 in a fore or aft direction (note action arrow A) along the seat rack 54 as well as moving the seat back 56 in a pivotal direction with respect to the seat bottom as indicated by action arrow B to provide any desired inclined seating position.

Figure 3:
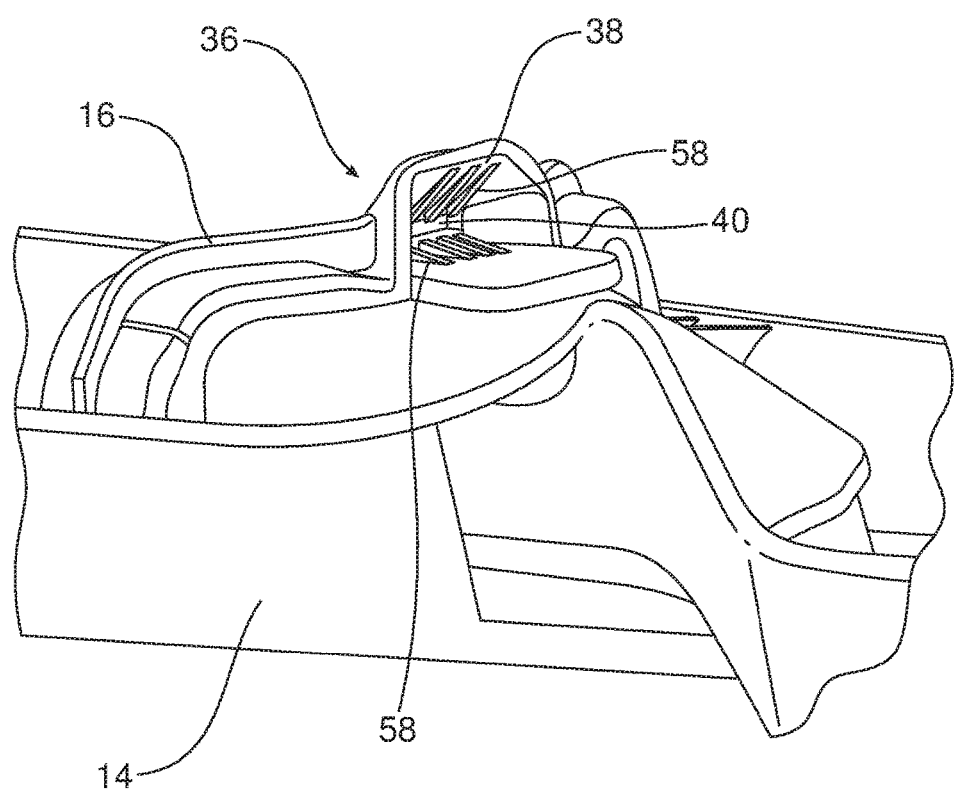
FIG. 3 is a detailed perspective view illustrating the integral mounting bridge in the form of a tapered receiver having first and second open ends.

The foregoing has been presented for purposes of illustration and description. It is not intended to be exhaustive or to limit the embodiments to the precise form disclosed. Obvious modifications and variations are possible in light of the above teachings. For example, as illustrated in FIGS. 1-3, a plurality of guide ribs 58 with cam surfaces may be provided along the interior walls of the tapered locator feature 36 in order to smoothly and efficiently direct the locator lug 44 on the seat frame 42 into the second or smaller open end 40 of the locator feature during the process of assembling the side shield 10 to the seat frame 42. All such modifications and variations are within the scope of the appended claims when interpreted in accordance with the breadth to which they are fairly, legally and equitably entitled.

What is claimed:

1. A side shield for a seat frame, comprising:
   a body including a housing and an integral mounting bridge;
   a seat control switch assembly held in an opening defined between said housing and said integral mounting bridge; and
   a tapered receiver carried on said integral mounting bridge, said tapered receiver having a first open end and a second open end.

2. The side shield of claim 1, wherein said first open end has a greater cross-sectional area than said second open end.

3. The side shield of claim 1, including a plurality of mounting bosses on said housing that receive and hold a plurality of fasteners securing said seat control switch assembly to said body.

4. The side shield of claim 3, wherein said housing includes a recessed portion and a plurality of apertures in said recessed portion that receive switch controls of said seat control switch assembly.

5. The side shield of claim 4, wherein said integral mounting bridge has a first end that engages said housing on a first side of said recessed portion and a second end that engages said housing on a second side of said recessed portion.

6. A seat assembly for a motor vehicle, comprising:
   a side shield including a body having a housing and an integral mounting bridge with a locator feature;
   a seat frame including a locator lug received in said locator feature; and
   a seat control switch assembly held in an opening defined between said housing and said integral mounting bridge.

7. The seat assembly of claim 6, further including a seat bottom and a seat back carried on said seat frame.

8. The seat assembly of claim 7, wherein said locator feature is a tapered receiver.

9. The seat assembly of claim 8, wherein said tapered receiver has a first open end and a second open end.

10. The seat assembly of claim 9, wherein said first open end has a greater cross-sectional area than said second open end.

11. The seat assembly of claim 8, including a plurality of mounting bosses on said housing that receive and hold a plurality of fasteners securing said seat control switch assembly to said body.

12. The seat assembly of claim 11, wherein said housing includes a recessed portion and a plurality of apertures in said recessed portion that receive switch controls of said seat control switch assembly.

13. The seat assembly of claim 12, wherein said integral mounting bridge has a first end that engages said housing on a first side of said recessed portion and a second end that engages said housing on a second side of said recessed portion.

14. A side shield for a seat frame, comprising:
   a body including a housing and an integral mounting bridge having a first end and a second end that engage said housing, said integral mounting bridge including a locator feature, wherein said locator feature is a tapered receiver having a first open end and a second open end.

15. The side shield of claim 14, wherein said first open end has a greater cross-sectional area than said second open end.

\* \* \* \* \*